United States Patent [19]

Ikesue

[11] 4,373,830
[45] Feb. 15, 1983

[54] METHOD FOR COUPLING STRANDED CABLE ASSEMBLY TO FITTING COUPLED ARRANGEMENT OBTAINED THEREBY

[75] Inventor: Haruyuki Ikesue, Fujisawa, Japan

[73] Assignee: NSK-Warner K.K., Kanagawa, Japan

[21] Appl. No.: 185,012

[22] Filed: Sep. 8, 1980

[30] Foreign Application Priority Data

Sep. 7, 1979 [JP]  Japan .............................. 54-115005

[51] Int. Cl.³ .............................................. B25G 3/28
[52] U.S. Cl. ...................................... 403/284; 29/509
[58] Field of Search ...................... 403/274, 284, 285; 29/509, 522 R, 522A, 517

[56] References Cited

U.S. PATENT DOCUMENTS 2,183,641  12/1939  Double ................................ 29/509
2,236,180  3/1941  Kost ..................................... 29/509

FOREIGN PATENT DOCUMENTS 117002  5/1943  Australia ............................. 403/284
147092  12/1903  Fed. Rep. of Germany ...... 403/274
561587  4/1957  Italy ..................................... 29/522
700142  11/1953  United Kingdom ............... 403/274
1408499  10/1975  United Kingdom .

Primary Examiner—Andrew V. Kundrat
Attorney, Agent, or Firm—Cantor and Singer

[57] ABSTRACT

The invention relates to a method for coupling a stranded cable assembly adapted for use in, for instance, a seat belt for automobiles, to a fitting. This method comprises inserting a sleeve into an opening provided in the fitting, inserting the mounting end of the stranded cable assembly into the sleeve and applying pressure onto the upper and lower sides of the sleeve in a direction perpendicular to the axial direction thereof to thereby secure said assembly to said sleeve and, at the same time, permit the sleeve to eat into the fitting.

4 Claims, 8 Drawing Figures

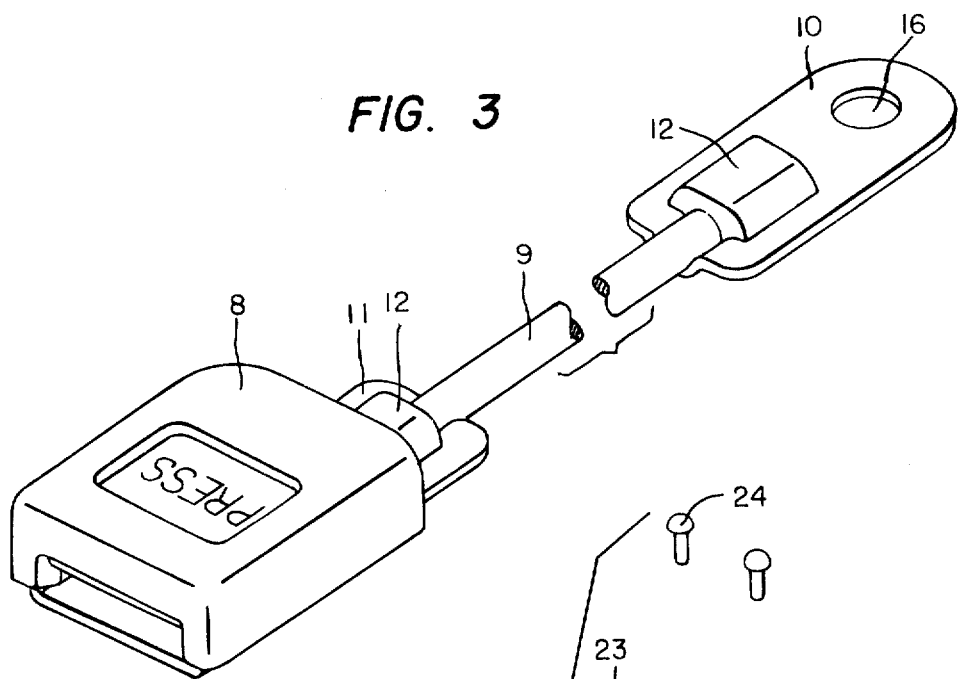
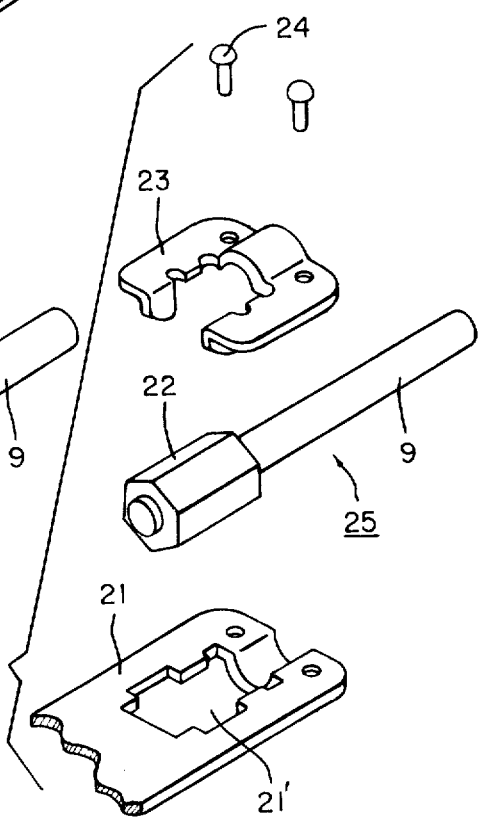
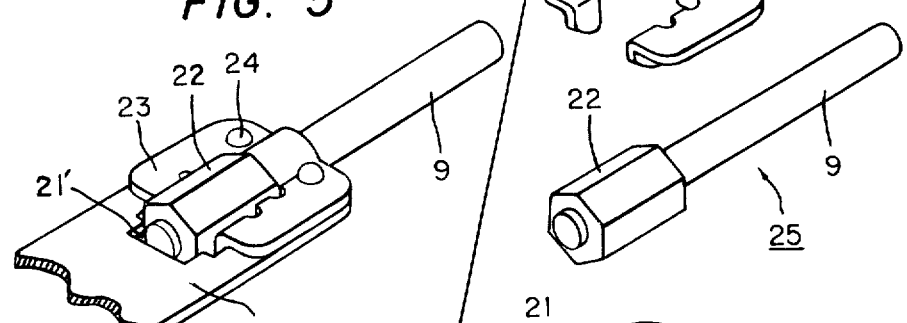

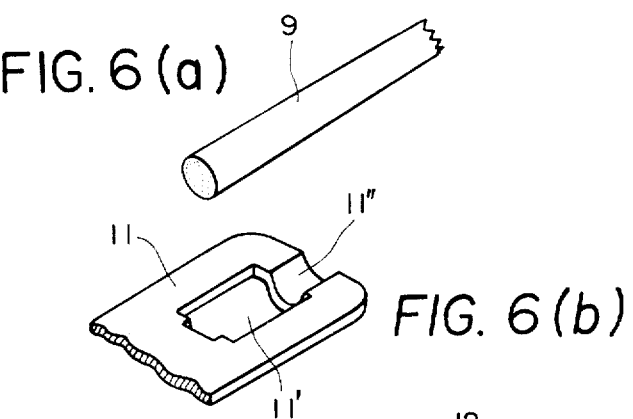
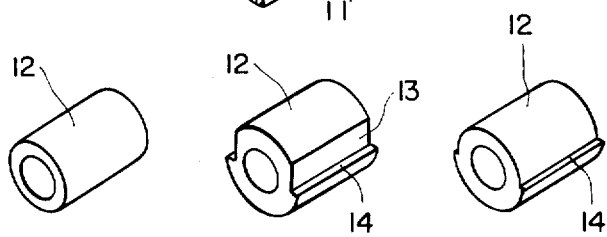
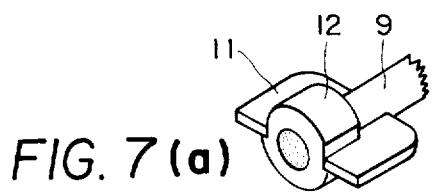
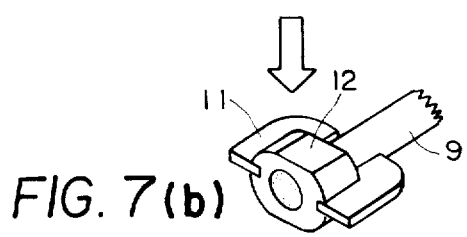

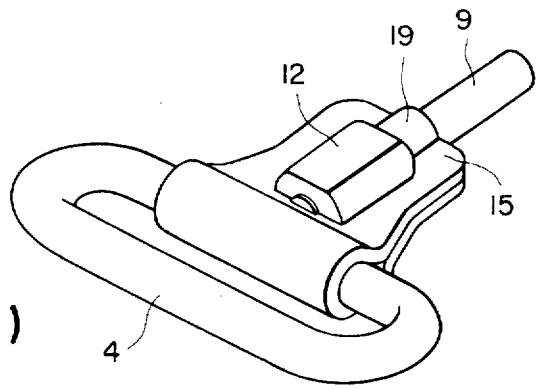
FIG. 8(a)
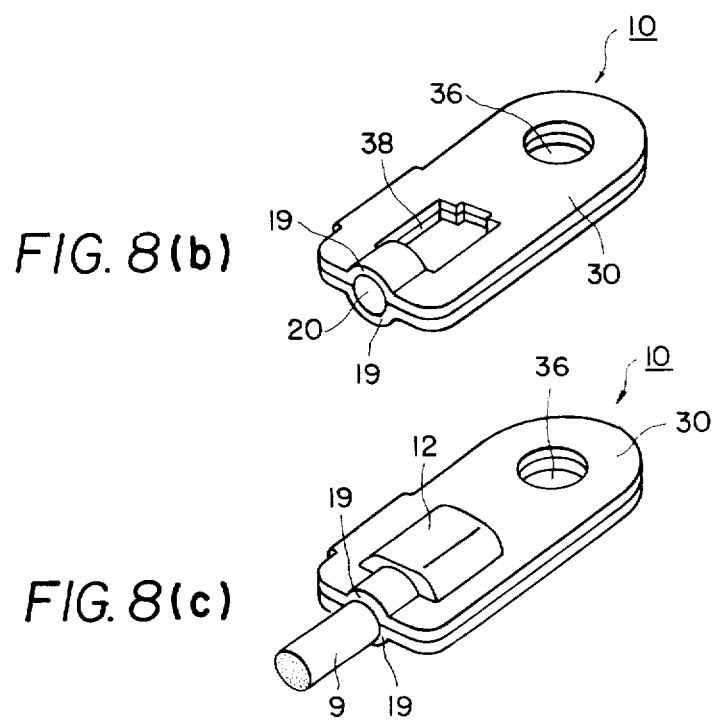
FIG. 8(b)
FIG. 8(c)

METHOD FOR COUPLING STRANDED CABLE ASSEMBLY TO FITTING COUPLED ARRANGEMENT OBTAINED THEREBY

BACKGROUND OF THE INVENTION

The present invention relates to a method for coupling a stranded cable assembly adapted for use in, e.g., a seat belt for automobiles to a fitting for mounting thereof, and to a coupled arrangement obtained thereby.

Various methods for coupling a stranded cable assembly used for a seat belt to a fitting for mounting thereof are well known. For example, British Pat. No. 1,408,499 discloses and claims a cable anchorage wherein a ferrule swaged to the cable has on opposite sides aligned longitudinal grooves, and the fitting incorporates spaced parallel guides adapted to be slidably received in the groove in the ferrule. The ferrule engages with a stop abutment to prevent axial movement of the ferrule relative to the fitting under a force tending to separate them.

As shown in the instant FIG. 4, on the other hand, it is known to place in a window or opening 21' in a buckle base body 21 an arrangement in which a stranded cable assembly 9 is firmly fitted into a sleeve 22 by caulking. In order to keep the stranded cable assembly in place, a plate 23 is further placed on the arrangement 25. The buckle base 21 and the plate 23 are then caulked by rivets 24 to secure the stranded cable assembly to the buckle base. FIG. 5 illustrates the arrangement thus assembled.

In the prior art, it is also proposed to form a groove or the like on the sleeve which has been fitted over the stranded cable assembly in order to fix the sleeve to the buckle base or the like.

However, the prior art arrangement has a disadvantage that the number of the parts used is considerable, thus rendering the coupling operation laborious.

SUMMARY OF THE INVENTION

A main object of the present invention is to provide a solution for the above-mentioned problem. According to the present invention, this object is achieved by a coupling method comprising the steps of inserting a sleeve into an opening provided in a fitting, inserting the mounting end of a stranded cable assembly into the sleeve and applying pressure onto the upper and lower sides of the sleeve in a direction perpendicular to the axial direction thereof to thereby secure said assembly to said sleeve and, at the same time, permit the sleeve to bite into the fitting. Thus, the stranded cable assembly is easily coupled to the fitting without the need of a rivet or the like means.

BRIEF DESCRIPTION OF THE DRAWINGS

Other object and advantages of the present invention will become apparent from a reading of the following description in conjunction with the accompanying drawings in which:

FIG. 3 is a perspective view of a stranded cable assembly coupled to a buckle or an anchor plate;

FIGS. 4 and 5 show the prior art coupling method;

FIGS. 6a–6e and FIG. 7 show one embodiment of the coupling method according to the present invention; and FIG. 8 is views of a modified embodiment of FIG. 7.

DETAILED DESCRIPTION OF THE INVENTION

Figure 1:
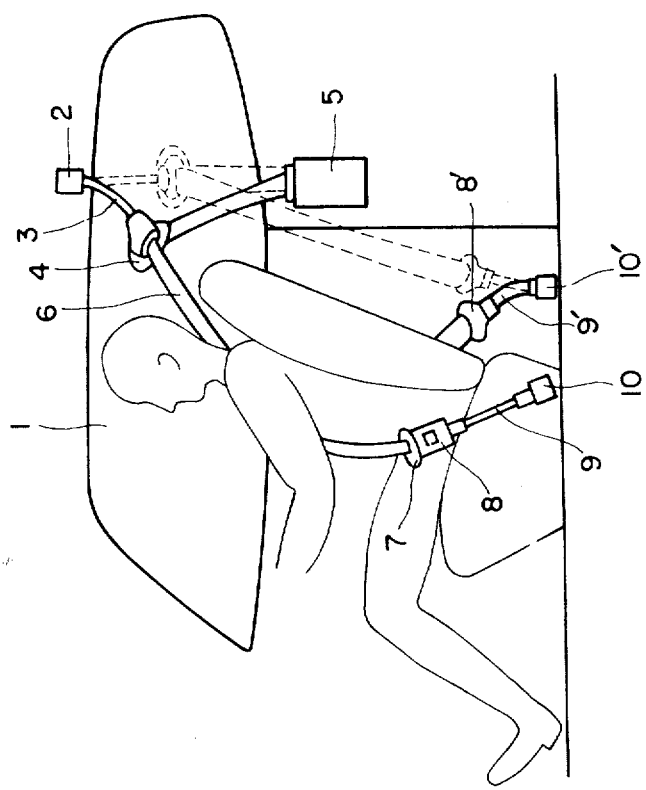
FIGS. 1 and 2 show a seat belt which is in use.
Figure 2:
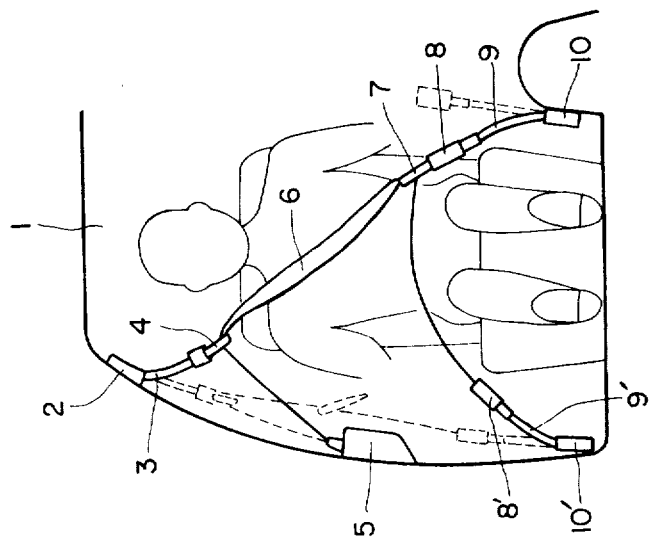

Referring now to FIGS. 1 and 2 given for a better understanding of the present invention, there is shown a typical embodiment of a seat belt mounted on the car body 1. A through belt 3 is secured on the car body 1 through a mounting portion 2. A webbing 6 is reeled out from a take-up mechanism 5 via a through ring 4 attached to the free end of the through belt 3 to hold the upper half of a wearer in place, and is further unreeled through a tongue 7 located adjacent to the waist until its free end enters the foremost portion of a webbing retainer fitting 8' to hold the waist in place. The tongue 7 is fixedly inserted into a buckle 8. In these figures, the dotted and solid lines indicate the states where the arrangement is in and out of use, respectively. Both the buckle 8 and the webbing retaining fitting 8' are then supported by a stranded cable assembly 9 and 9' including a lower anchor plate 10 and 10' fixed on the floor of the car body or the side of the seat.

As will be understood from FIG. 3 best illustrating an arrangement of the buckle and the stranded cable assembly, the stranded cable assembly 9 is secured between the buckle 8 and the anchor plate 10 through a sleeve 12, and is fixed on the buckle side to a fitting 11 for mounting of a buckle base etc. Reference numeral 16 stands for an opening for mounting of the anchor plate. Retainer fitting 8' is mounted to anchor plate 10' via a similar arrangement.

More specifically, the present invention is concerned with a method for coupling the stranded cable assembly 9 to the sleeve 12 and the sleeve to the fitting 11 or the anchor plate 10 in a single step, and to a coupled arrangement attained thereby.

The present invention will now be explained indetail with reference to FIGS. 6 and 7.

Referring to FIG. 6 illustrating the parts in a disassembled state, a sleeve 12 in the form illustrated in 12c, d or e is inserted into an opening 11' provided in a fitting 11 for mounting of a buckle base body or an anchor plate as shown in 12b. The free end of a stranded cable assembly 9 shown in 12a is then inserted into the sleeve with its neck being placed in a recession 11". With pressure applied onto the upper and lower sides of the sleeve 12 in a direction perpendicular to its axis, the sleeve expands laterally so that it abuts the cable and bites firmly into the fitting 11. 12c, d and e show several embodiments of the sleeve 2 used; c depicting a sleeve in the cylindrical form in a state prior to the application of pressures; d a sleeve having flat walls 13 and steps 14 on its both sides; and e a sleeve having only steps 14 on its both sides. Turning now to FIG. 7 (a and b: before and after the application of pressure, respectively ) illustrating the sleeve 12 of FIG. 6d which is in use, the sleeve 12 is inserted into the opening 11' in the fitting 11. Upon receipt of the pressure from above and below in a direction perpendicular to its axis, the sleeve expands so that it abuts upon the cable and bites firmly into the fitting, as shown in FIG. 7b.

FIG. 8 shows a modification wherein the fitting is of a two-ply structure. As will be understood from FIG. 8b best illustrating the anchor plate 10, the fitting is formed of two plates 30 laminated one upon another under pressure, having therein a mounting opening 36 and a sleeve-insertion opening 38. The two plates 30 have curved ends 19 which define together an opening 20 through which the stranded into the opening 38, into which the stranded cable assembly 9 is inserted by way of the opening 20. Application of pressure onto the upper and lower sides of the sleeve in a direction perpendicular to its axis permits it to be coupled to the fitting, as shown in FIG. 8c.

In order to keep a through ring 4 in place, a metal place having the through ring 4 wound around it is folded together to form a support plate 15 of a two-ply structure under pressure. The two-ply support plate 15 thus formed is curved at one end 19 to define an opening 20 through which the stranded cable assembly 9 is passed. It will be understood that the support plate has therein a sleeve-insertion opening. The stranded cable assembly is inserted into the sleeve 12 which has been placed into the sleeve-insertion opening. With the pressure applied onto the upper and lower sides of the sleeve in a direction perpendicular to its axis, the sleeve is coupled to the fitting, as shown in FIG. 8a.

As evident from the foregoing, the present invention has the advantage that the number of the production steps and the parts used are limited as compared with the prior art.

What is claimed is:

1. A method for coupling a stranded cable assembly to a fitting, comprising the steps of inserting a cylindrical sleeve into an opening provided in the fitting, inserting the mounting end of the stranded cable assembly into the sleeve and applying pressure onto the upper and lower sides of the sleeve in a direction perpendicular to the axial direction thereof to thereby secure said assembly to said sleeve and, at the same time, permit the sleeve to bite into the fitting.

2. The coupling method as recited in claim 1, in which the sleeve is cylindrical in form, having flat walls and steps on its both sides.

3. The coupling method as recited in claim 1, in which the sleeve is cylindrical in form, having only steps on its both sides.

4. A coupled arrangement of a stranded cable assembly and a fitting, in which a sleeve is inserted into an opening provided in the fitting, the stranded cable assembly is inserted into the sleeve, and pressure is applied onto the upper and lower sides of the sleeve in a direction perpendicular to the axial direction thereof to thereby secure said assembly to said sleeve and, at the same time, permit it to bite into the fitting.

* * * * *